Nov. 27, 1956 D. E. HARPFER ET AL 2,772,056
REEL
Filed Dec. 30, 1953

SLOT TO RECEIVE AT LEAST DOUBLE HOSE THICKNESS

INVENTOR.
DONALD E. HARPFER
ABEL F. GEISINGER
BY
R. L. Miller
ATTORNEY

United States Patent Office 2,772,056
Patented Nov. 27, 1956

2,772,056

REEL

Donald E. Harpfer and Abel F. Geisinger, Akron, Ohio, assignors to The Goodyear Tire & Rubber Company, Akron, Ohio, a corporation of Ohio Application December 30, 1953, Serial No. 401,230

2 Claims. (Cl. 242—96)

This invention relates to reels and more particularly to an improved hose reel that includes means to stop the flow through the hose beyond any selected point along the hose.

Recently hose used as a sprinkler to cover a substantial area with one setting has been placed on the market and provides a very practical and readily maneuverable sprinkler. One form of sprinkler hose is a relatively light gauge, readily collapsible hose that contains many minute openings at circumferentially and longitudinally spaced intervals along the hose. One end of the hose is attached to the water line by means of the usual female coupling with the other end being open. In use the hose is closed off at any selected position and as a result the water passes through the hose up to the point that the hose is closed off. A fine spray covering a substantial area along each side of the hose is emitted from the openings above the ground and seeps through the openings that are in contact with the grounds soaking the ground beneath the hose. Hose of this type readily follows the contour of the ground and can be laid in any desired pattern on the ground and to any desired extent so as to provide watering of the selected areas. If the full length of the hose is not needed, the hose need only be closed off at the desired position along its length.

Many devices may be used in association with the hose to close off the hose at any position but this invention contemplates combining a shut-off device with the reel used to store the hose. It is, therefore, an object of the invention to provide a simple device to store the hose that includes shut-off means.

Another object is to provide a very practical and inexpensive hose reel including shut-off means therewith.

A further object is to provide a hose reel that is lightweight and easily manipulated when used to wind the hose thereon and shut off the hose at any position.

A still further object is to provide a hose reel including shut-off means that is durable and will not readily become separated from the hose during use.

Other objects and advantages of this invention will become apparent hereinafter as the description thereof proceeds, the novel features, arrangements and combinations being clearly pointed out in the specification as well as in the claims appended.

Figure 1:
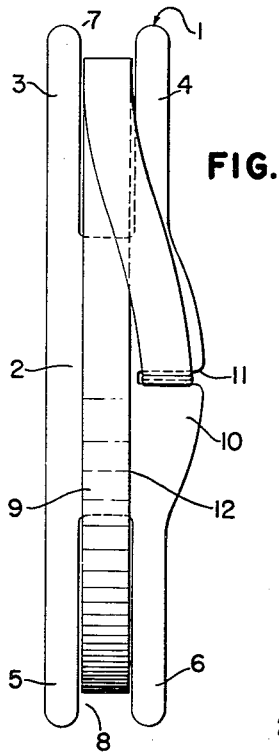
Fig. 1 is an elevation of the reel with the hose wound thereon.

The reel 1 is formed preferably from a lightwieght durable material by molding from one of the many available plastics but may be formed from any suitable material, such as metal or wood. The reel 1 generally comprises a body portion 2 with arm members 3 and 4 extending from one end of the body 2 and arm members 5 and 6 extending from the opposite end of the body. The reel 1 thus has a pair of oppositely disposed recesses 7 and 8 to receive the hose 9 when wound about the reel 1. The distance between the arms 3 and 4 or 5 and 6 is preferably slightly greater than the width of the collapsed hose so that the hose may be easily wound or unwound. The hose 9 is a thin walled hose that readily collapses to the flattened position when not subjected to water pressure. A wall gauge of approximately .030 inch has been found to be very satisfactory for a hose of this type.

Figure 2:
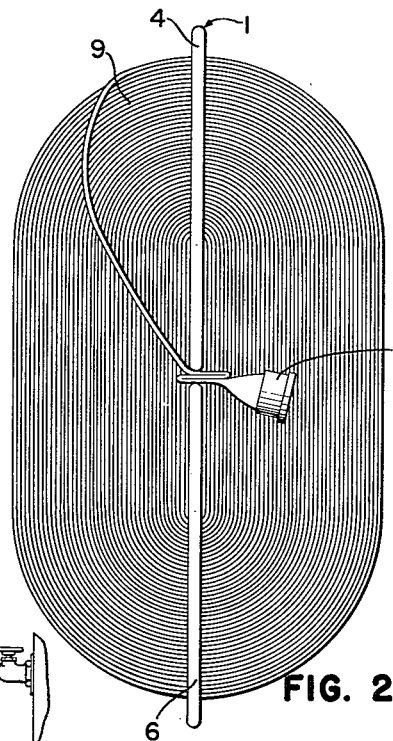
Fig. 2 is a side elevation of Fig. 1.

In the form of the reel shown in Figs. 1 and 2, the body 2 is formed with an outwardly extending raised portion 10 along one side with a slot 11 formed in the portion 10 extending substantially normal to the longitudinal axis of the reel. The slot is of a depth at least equal to the width of the collapsed hose and the inner end of the slot lies outside the edge of the hose indicated by the numeral 12 when it is wound on the reel to permit the slot 11 to be used without interference. The slot 11 is of a width so as to collapse and maintain the portion of the hose collapsed when it is inserted in the slot 11. It has been found that a slot width between 75% and 100% of the total thickness of the hose to be inserted in the slot will satisfactorily pinch the hose to shut off flow through the hose beyond that point and also accommodate the usual tolerances encountered in manufacturing operations. Each fold of the hose that is to be inserted in the slot includes a double wall of hose and the compressibility of the hose permits the hose to be slightly squeezed or pinched if necessary to insert in the slot.

Figure 3:
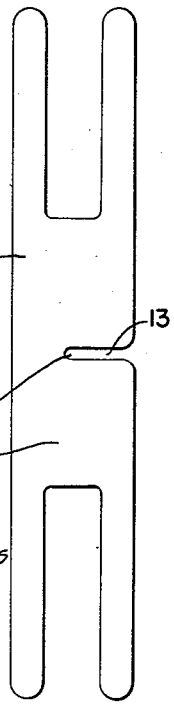
Fig. 3 is a plan view of a modified form of the reel.

In the modification illustrated in Fig. 3, the slot 13 in the body portion 14 of the reel 15 extends into the body portion 14 so as to underlie the hose when it is wound on the reel. In order to insert the hose in the slot 13 it is necessary to unwind the hose from the reel before the slot 13 can be used.

Figure 4:
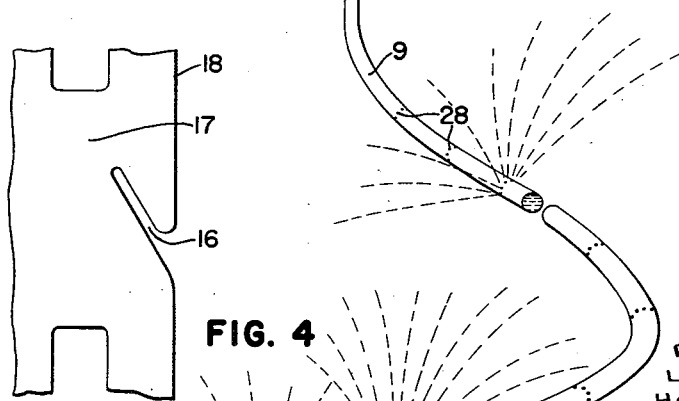
Fig. 4 is an enlarged partial plan view of another modification of the invention.

In the modification shown in Fig. 4, the slot 16 extends into the body portion 17 of the reel 18 at a substantial angle to the side of the reel. The inner end of the slot is free of the hose wound about the reel so that any hose wound on the reel will not interfere with the insertion of the hose in the slot 16.

Figure 5:
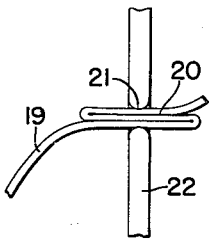
Fig. 5 is an enlarged partial view illustrating one manner of using the reel to stop the flow of water through the hose.
Figure 6:
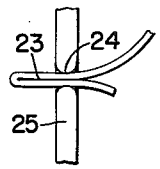
Fig. 6 is an enlarged part view illustrating another manner of using the invention to stop the flow of water through the hose.

Figs. 5 and 6 illustrate the preferred methods of using the reel to pinch or shut off the hose at any selected position. In Fig. 5 the hose 19 is triple-folded at the desired position and then the triple fold 20 is inserted in the slot 21 in the reel 22. The slot retains the hose in this pinched relation so that no water can flow through the hose beyond that point. Similarly in Fig. 6, a double fold 23 of hose is inserted in the slot 24 of the reel 25. The width of the slot is made within the prescribed limits to correspond to the particular number of folds of hose intended to be inserted in the slot.

Figure 7:
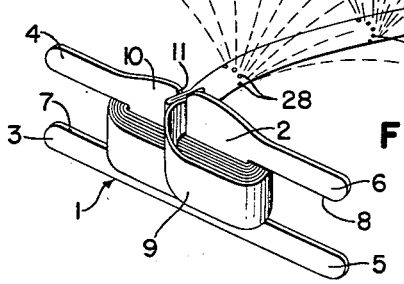
Fig. 7 is a view illustrating the invention in use.

In use, the usual hose coupling 26 on one end of the sprinkler hose 9 is attached to a water faucet 27 in the usual manner and then the hose is unwound from the reel as shown in Fig. 7. After the desired length of hose is unwound and positioned for sprinkling, a small portion of the hose is folded, double or triple preferably, and inserted in the slot in the reel. The faucet is then opened and the water rounds out the collapsed hose up to the folded portion confined in the reel slot. The water sprays through the tiny openings 28 spaced around and along the hose or seeps out through those openings 28 that are in contact with the ground. The unused portion of the hose remains wound about the reel with the exception of the reel illustrated in Fig. 3 with which it is necessary to unreel all of the hose to allow the slot to be used. If the entire length of hose is needed, the end of the hose is folded and inserted in the slot. It is apparent that all the full length or any portion of the hose may be used by simply changing the position at which the hose is pinched off by the reel.

As shown, the slot which serves as the shut-off means is located in each modification on the body portion of the reel, although it is apparent that it may be located on one of the arms. The two essential features of the slot are that it be deep enough to receive the entire width of the collapsed hose and have a width that will allow the hose to be inserted readily and yet not permit the hose to slip out of the slot.

While certain representative embodiments and details have been shown for the purpose of illustrating the invention, it will be apparent to those skilled in this art that various changes may be made therein without departing from the spirit or scope of the invention.

Having thus fully described our invention, what we claim and desire to secure by Letters Patent of the United States is:

1. The combination with a reel having a portion adapted for reeling a readily collapsible hose thereabout, of pinching means to prevent flow through the hose beyond any selected point along its length, comprising a straight-sided slot in said reel, said slot having substantially parallel sides and having a depth at least equal to the width of the hose when collapsed and a minimum width of 75% and a maximum width of 100% of the total thickness of the collapsed hose to be inserted in the slot to maintain the portion of the hose inserted in said slot in the completely collapsed condition.

2. A hose as described in claim 1 in which the slot is of a width to receive a triple fold of the hose.

References Cited in the file of this patent

UNITED STATES PATENTS 1,634,436     Polson  ---------------- July 5, 1927

FOREIGN PATENTS 277,242     Switzerland  ------------ Dec. 1, 1951